United States Patent
Lynch et al.

(10) Patent No.: US 11,097,494 B2
(45) Date of Patent: Aug. 24, 2021

(54) SYSTEM AND METHOD OF USING LASERS TO SEAL AN EDGE OF A COVERING OF AN ARCHITECTURAL-STRUCTURE COVERING

(71) Applicant: Hunter Douglas, Inc., Pearl River, NY (US)

(72) Inventors: David Lynch, Centennial, CO (US);
Stephen T. Wisecup, Denver, CO (US);
Patrick Foley, Evergreen, CO (US);
Wayne Rayman, Broomfield, CO (US)

(73) Assignee: HUNTER DOUGLAS INC., Pearl River, NY (US)

( * ) Notice: Subject to any disclaimer, the term of this patent is extended or adjusted under 35 U.S.C. 154(b) by 0 days.

(21) Appl. No.: 16/843,020

(22) Filed: Apr. 8, 2020

(65) Prior Publication Data

US 2020/0331210 A1 Oct. 22, 2020

Related U.S. Application Data

(60) Provisional application No. 62/836,758, filed on Apr. 22, 2019.

(51) Int. Cl.
*B29C 65/16* (2006.01)
*B23K 26/38* (2014.01)
*B23K 26/20* (2014.01)

(52) U.S. Cl.
CPC ........ *B29C 65/1648* (2013.01); *B23K 26/206* (2013.01); *B23K 26/38* (2013.01)

(58) Field of Classification Search
CPC .. B23K 26/38; B23K 26/206; B29C 65/1648; B29C 65/16
See application file for complete search history.

(56) References Cited

U.S. PATENT DOCUMENTS

| | | | |
|---|---|---|---|
| 4,680,442 | A | 7/1987 | Bauer et al. |
| 4,693,771 | A | 9/1987 | Payet et al. |

(Continued)

FOREIGN PATENT DOCUMENTS

| | | | | |
|---|---|---|---|---|
| DE | 102014119075 A1 | 6/2016 | | |
| GB | 2544551 A | * | 5/2017 | ............... A45F 5/02 |
| WO | 1999037851 A1 | 7/1999 | | |

OTHER PUBLICATIONS

Author Unknown, "Laser Cut Fabric—About Us" Laser Cut Fabric—retrieved Jan. 20, 2019. URL: http://www.lasercutfabric.com/.

(Continued)

*Primary Examiner* — Daniel McNally
(74) *Attorney, Agent, or Firm* — Kacvinsky Daisak Bluni PLLC

(57) ABSTRACT

A system and method for laser sealing an edge portion of a covering of an architecture-structure covering is disclosed. In one embodiment, after cutting a covering of an architectural-structure covering to an appropriate size, lasering the cut edge portions or surfaces of the covering to seal the cut edge portions or surfaces of the covering to prevent fraying. The beam of the laser may be positioned to contact the cut edge portions or surfaces of the covering in a plane of the fabric. Subsequently, the beam of the laser scans or moves across the surface of the cut edge portion of the covering. In use, the beam of the laser is arranged and configured to apply heat to the surface of the fabric material at discrete points or spots to vaporize any loose fibers located along the cut edge portion of the covering.

11 Claims, 5 Drawing Sheets

(56) References Cited

U.S. PATENT DOCUMENTS

| | | | |
|---|---|---|---|
| 4,908,494 A | 3/1990 | Faiz et al. | |
| 5,200,592 A | 4/1993 | Yabu | |
| 5,445,599 A | 8/1995 | Edenbaum | |
| 5,614,115 A | 3/1997 | Horton et al. | |
| 5,690,778 A * | 11/1997 | Swiszcz | D06M 15/693 |
| | | | 156/308.4 |
| 6,278,079 B1 | 8/2001 | McIntyre et al. | |
| 7,284,305 B1 | 10/2007 | Allen et al. | |
| 7,615,128 B2 | 11/2009 | Mikkelsen | |
| 8,117,674 B2 | 2/2012 | Warren et al. | |
| 9,038,514 B2 | 5/2015 | Severino et al. | |
| 9,163,353 B2 | 10/2015 | Lin | |
| 9,751,156 B2 | 9/2017 | Severino et al. | |
| 9,895,819 B1 | 2/2018 | Aminpour | |
| 10,155,343 B2 | 12/2018 | Eyal | |
| 10,179,975 B2 | 1/2019 | Botelho et al. | |
| 2003/0034335 A1 | 2/2003 | Goto et al. | |
| 2007/0075455 A1 | 4/2007 | Marini et al. | |
| 2007/0234862 A1 | 10/2007 | Mikkelsen | |

OTHER PUBLICATIONS

Rorah., "Laser cutting and etching textiles and apparel design: An experimental study on the implementation and documentation of laser cutting and etching in the apparel design creative process" Copyright © Whitney Rorah, 2016.
Robinson, Brian; Hodges, Heather., "Laser cuts multilayer textiles" Apr. 1, 2004. URL: https://www.industrial-lasers.com/articles/print/volume-19/issue-4/features/laser-cuts-multilayer-textiles.html.

* cited by examiner

SYSTEM AND METHOD OF USING LASERS TO SEAL AN EDGE OF A COVERING OF AN ARCHITECTURAL-STRUCTURE COVERING

CROSS-REFERENCE TO RELATED APPLICATIONS

This is a non-provisional of, and claims the benefit of the filing date of, U.S. provisional patent application No. 62/836,758, filed Apr. 22, 2019, entitled "System and Method of Using Lasers to Seal an Edge of a Covering of an Architectural-Structure Covering," which application is incorporated by reference herein in its entirety.

FIELD OF THE DISCLOSURE

The present disclosure relates generally to the field of architectural-structure coverings, and relates more particularly to a system and method of using a laser to seal an edge of a covering of an architectural-structure covering.

BACKGROUND

Architectural-structure coverings may selectively cover an architectural structure such as, for example, a window, a doorway, a skylight, a hallway, an archway, a portion of a wall, etc. Generally speaking, architectural-structure coverings may include a covering portion such as, for example, a fabric or the like (referred to herein as a "covering"), that can be extended and retracted, for example, vertically extendable or retractable (e.g., capable of being lowered or raised, respectively, in a vertical direction) between an extended position and a retracted position for obscuring and exposing the underlying architectural structure. That is, the architectural-structure covering may be configured to be mounted to a wall or other structure above an architectural structure in a conventional manner that will be recognized by those of ordinary skill in the art. In use, the covering may be configured to be vertically extended and retracted between an extended position, wherein the covering may partially or entirely cover the architectural structure, and a retracted position, wherein the covering may be retracted.

As will be readily appreciated by one of ordinary skill in the art, during manufacturing of the architectural-structure covering, the covering may need to be cut to an appropriate size. For example, lateral edges or portions of the covering may need to be cut to the appropriate width. Similarly, top and/or bottom edges or portions may need to be cut to the appropriate length or height.

Today, it is common for manufacturers to cut coverings to size. For example, it is common for manufacturers to cut coverings perpendicular to a plane of the covering (e.g., coverings are cut perpendicular to a front surface of the covering) so that the coverings can be appropriately sized. In one embodiment, manufacturers may use a knife or guillotine to cut the covering to an appropriate size. Alternatively, it is common for manufacturers to cut coverings perpendicular to a plane of the covering to appropriately size the covering using, for example, a laser. In either event, a number of challenges need to be faced and overcome. For example, when cutting coverings made from a fabric material, such as, for example, a woven polyester, the edges of the cut fabric may become frayed, unwoven, unraveled, etc. As a result, the edges of the cut fabric covering are often sealed using, for example, a chemical sealant. As will be appreciated, this adds complexity, time and expense to the manufacturing operation. In addition, the use of chemicals can result in staining or discoloration of the fabric. Moreover, when utilizing lasers to cut a cellular covering to size, adjacent cells or layers of material may become sealed or melted together during the laser cutting.

It is with respect to these and other considerations that the present improvements may be useful.

SUMMARY

This Summary is provided to introduce in a simplified form, a selection of concepts that are further described below in the Detailed Description. This Summary is not intended to identify key features or essential features of the claimed subject matter, nor is it intended as an aid in determining the scope of the claimed subject matter.

A system and method for laser sealing an edge portion of a covering of an architecture-structure covering is disclosed. In one embodiment, after cutting a covering of an architectural-structure covering to an appropriate size (e.g., after cutting the covering perpendicular to a plane of the covering), the cut edge portions or surfaces of the covering are exposed to laser energy to seal the cut edge portions or surfaces of the covering to remove frays and/or to prevent fraying.

In one embodiment, the beam of the laser may be positioned to contact the cut edge portions or surfaces of the covering in a plane of the fabric (e.g., parallel to the plane of the cut fabric or perpendicular to the plane of the cut). That is, a laser may be appropriately positioned such as, for example, positioned along a plane of the cut fibers (e.g., the laser is arranged and configured perpendicular to the surface of the cut edge). Subsequently, the beam of the laser can be scanned across the surface of the cut edge portion of the covering. That is, the laser beam may oscillate across the surface of the cut edge portion of the covering while simultaneously translating as it oscillates to cover the surface of the cut edge portion of the covering.

In use, the beam of the laser is arranged and configured to apply heat to the surface of the fabric material at discrete points or spots. Thus arranged, the laser is arranged and configured to vaporize, cut, remove, etc. any loose fibers located along the cut edge portion of the covering. In addition, the laser may be arranged and configured to melt portions of the fabric together while preventing, or at least minimizing, melting adjacent layers of, for example, stacked, folded, or cellular coverings together. That is, the laser is arranged and configured to supply sufficient heat at very discrete points of the fabric along the cut edge of the fabric layers to thereby prevent, or at least minimize, an entire thread from pulling away and unravelling.

In one example of an embodiment, a method for laser sealing a cut edge portion of a covering of an architectural-structure-covering is disclosed. The method comprises positioning said covering on a surface, positioning a laser relative to said covering so that a beam of said laser contacts said cut edge portion of said covering, said laser oriented so that the beam is non-perpendicular to a plane of the covering, and moving said beam of said laser across said cut edge portion of the covering to seal said cut edge portion to prevent fraying.

DETAILED DESCRIPTION

Figure 1:
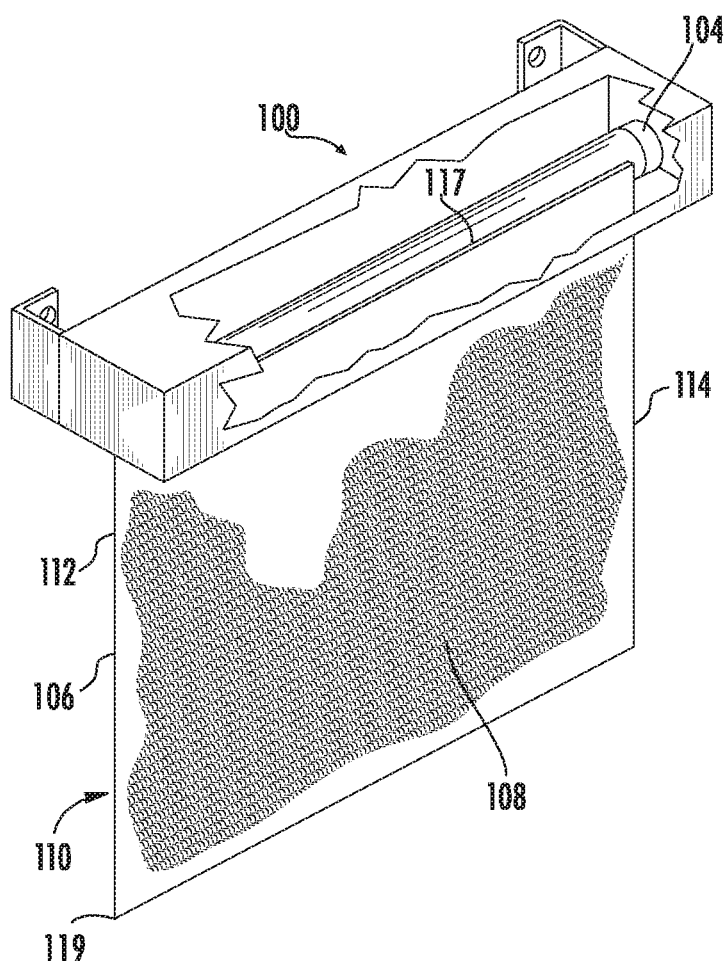
FIG. 1 is a front, perspective view illustrating a known architectural-structure covering.

Various features, aspects, or the like of a system and method of using lasers to seal an edge of a covering of an architectural-structure covering will now be described more fully hereinafter with reference to the accompanying drawings, in which one or more aspects or features of the system and method will be shown and described. It should be appreciated that the various features, aspects, or the like may be used independently of, or in combination, with each other. It will be appreciated that the system and method as disclosed herein may be embodied in many different forms and should not be construed as being limited to the embodiments set forth herein with all features being present. Rather, these embodiments are provided so that this disclosure will convey certain aspects of the system and method to those skilled in the art. In the drawings, like numbers refer to like elements throughout unless otherwise noted.

It should be understood that, as described herein, an "embodiment" (such as illustrated in the accompanying Figures) may refer to an illustrative representation of an environment or article or component in which a disclosed concept or feature may be provided or embodied, or to the representation of a manner in which just the concept or feature may be provided or embodied. However, such illustrated embodiments are to be understood as examples (unless otherwise stated), and other manners of embodying the described concepts or features, such as may be understood by one of ordinary skill in the art upon learning the concepts or features from the present disclosure, are within the scope of the disclosure. In addition, it will be appreciated that while the Figures may show one or more embodiments of concepts or features together in a single embodiment of an environment, article, or component incorporating such concepts or features, such concepts or features are to be understood (unless otherwise specified) as independent of and separate from one another and are shown together for the sake of convenience and without intent to limit to being present or used together. For instance, features illustrated or described as part of one embodiment can be used separately, or with another embodiment to yield a still further embodiment. Thus, it is intended that the present subject matter covers such modifications and variations as come within the scope of the appended claims and their equivalents.

As will be described in greater detail below, the system and method in accordance with one or more aspects of the present disclosure may be configured to seal one or more edges of a covering of an architectural-structure covering. That is, for example, after the covering of an architectural-structure covering has been appropriately sized, a laser may be used to seal the edges of the cut edge portions or surfaces of the covering. By utilizing a laser to seal the edges of the covering, the edges of the covering are appropriately sealed to prevent, or at least minimize, fraying, unraveling, etc. In addition, the use of chemical sealants can be eliminated. In addition, increased automation, and reduce time and expense are achievable.

In one embodiment, a method for sealing one or more edges of a covering of an architectural-structure covering is disclosed. In one embodiment, the method for laser sealing a cut edge portion of a covering of an architectural-structure-covering includes positioning a covering on a surface; positioning a laser relative to the covering so that a beam of the laser contacts a cut edge portion of the covering, the laser oriented so that the beam is non-perpendicular to a plane of the covering; and moving the beam of the laser across the cut edge portion of the covering to seal the cut edge portion to prevent fraying.

In one embodiment, the covering is a honeycomb covering and, optionally, the honeycomb covering is compressed into a closed position.

In one embodiment, moving the beam of the laser across the cut edge portion includes oscillating the beam of the laser across a surface of the cut edge portion of the covering. In one embodiment, the beam of the laser oscillates across the surface of the cut edge portion of the covering with 40 lines per inch. In one embodiment, positioning a laser relative to the covering includes positioning the laser so that the beam is parallel to a plane of the covering. In one embodiment, positioning a laser relative to the covering includes positioning the laser so that the beam is perpendicular to a plane of the cut edge portion of the covering.

Referring to FIG. 1, a front view of an example of an embodiment of an architectural-structure covering 100 is shown. As shown, the architectural-structure covering 100 includes a covering 106. The architectural-structure covering 100 may be configured to be mounted to a wall or other structure above an architectural structure in a conventional manner that will be recognized by those of ordinary skill in the art. In use, the covering 106 may be configured to be vertically extended and retracted between an extended position (shown in FIG. 1), wherein the covering 106 may partially or entirely cover the architectural structure, and a retracted position, wherein the covering 106 may be retracted. As shown, the covering 106 may include an upper portion, surface, or edge 117 (terms used interchangeably herein without the intent to limit) coupled to a roller tube 104 and a bottom edge, surface, or portion 119 (terms used interchangeably herein without the intent to limit). In addition, the covering 106 includes a front surface 108, a rear surface 110, first and second lateral edges, surfaces, or portions 112, 114 (also referred to herein as edge portions), respectively.

The covering 106 may be manufactured from any suitable material now known or hereafter developed. For example, in one embodiment, the covering 106 may be manufactured from a fabric material such as, for example, a polyester, etc.

Figure 2:
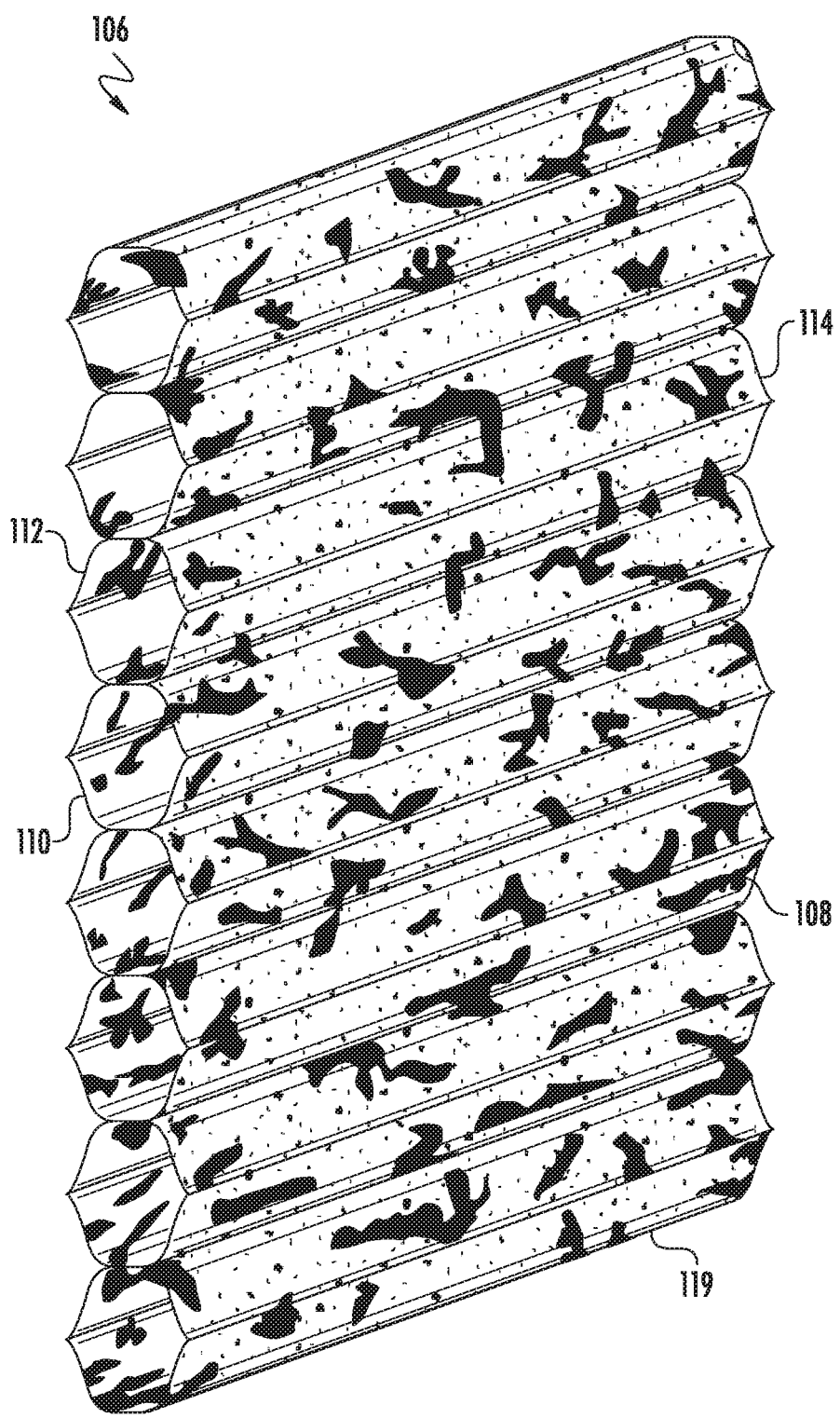
FIG. 2 is a front, perspective view illustrating an example of an embodiment of a honeycomb covering for use in an architectural-structure covering.

Although a particular example of a covering 106 and an architectural-structure covering 100 is shown in FIG. 1, many different types and styles of coverings and architectural-structure coverings exist and can be employed in place of the example illustrated in FIG. 1. For example, as will be described and illustrated herein, the system and method of the present disclosure may be particularly well-suited for use with a covering manufactured from multiple layers of stacked material such as, for example, a honeycomb style covering as generally illustrated in FIG. 2. However, it should be understood that features of the present disclosure may be used in combination with any suitable covering and/or architectural-structure covering now known or hereafter developed and thus features of the present disclosure should not be limited to any particular type of covering and/or architectural-structure covering.

Referring to FIG. 1, for the sake of convenience and clarity, all directional references or terms such as, for example, "face," "front," "back," "rear," "top," "bottom," "up," "down," "vertical," "horizontal", "inner," "outer", "proximal," "distal," "upper," "lower," "upward," "downward," "left", "right," "lateral," "longitudinal," "above," "below," "vertical," "horizontal," "radial," "axial," "clockwise," and "counterclockwise" are only used for identification purposes to aid the reader's understanding of the present disclosure, and do not create limitations, particularly as to the position, orientation, or use of this disclosure. These references are used herein to describe the relative placement and orientation of various components and portions, each with respect to the geometry and orientation of the architectural-structure covering 100 as they appear in FIG. 1. Said reference is intended to be non-limiting and is used herein merely to describe relationship between various components as illustrated in FIG. 1.

In accordance with one aspect of the present disclosure, a system and method for laser sealing an edge portion of a covering of an architecture-structure covering is disclosed. As previously mentioned, manufacturers face a number of challenges with preventing fraying of edge portions of cut fabric coverings. This is especially true when dealing with multiple layers of stacked fabric such as, for example, in connection with a honeycomb covering. For example, the multiple layers of stacked material do not lend themselves to be cut by a laser. As a result, a knife or guillotine may be needed to cut the stacked layers of fabric material. However, cutting a fabric covering with a knife or guillotine may result in unraveling, frayed edges, which need to be sealed using, for example, a chemical sealant.

Figure 3:
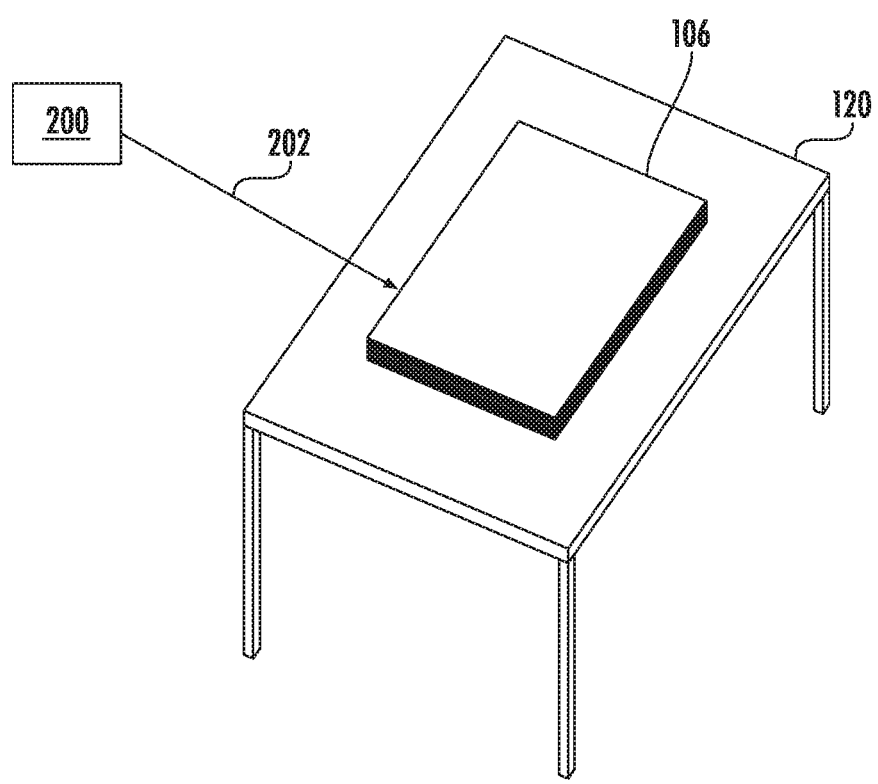
FIG. 3 is a perspective view illustrating a laser sealing cut edge portions of a covering in accordance with the present disclosure.
Figure 4:
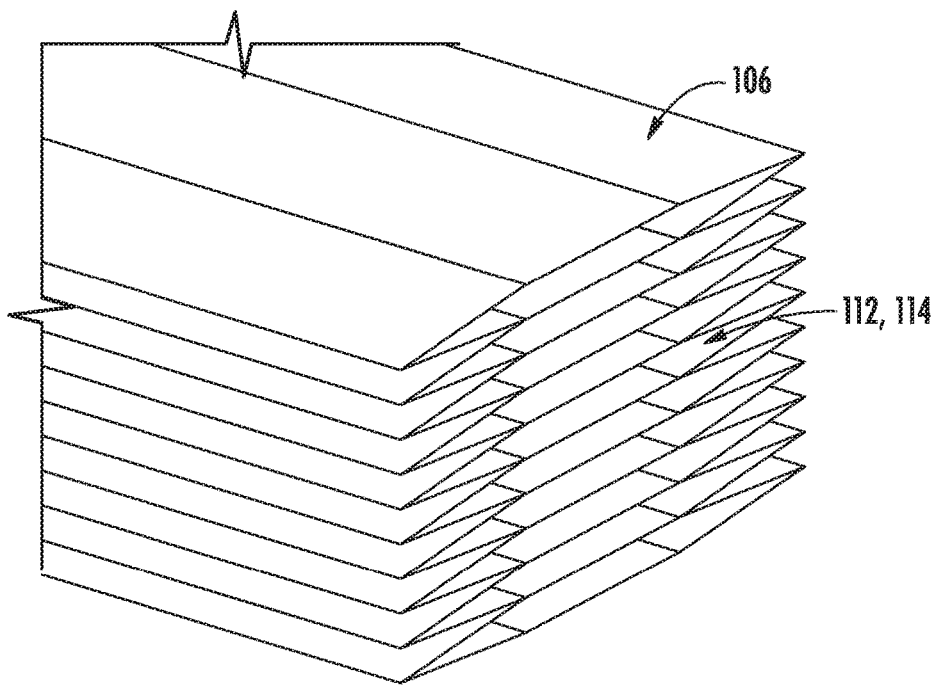
FIG. 4 is a perspective view illustrating the cut edge portions of the covering shown in FIG. 3 in a partially compressed state.
Figure 5:
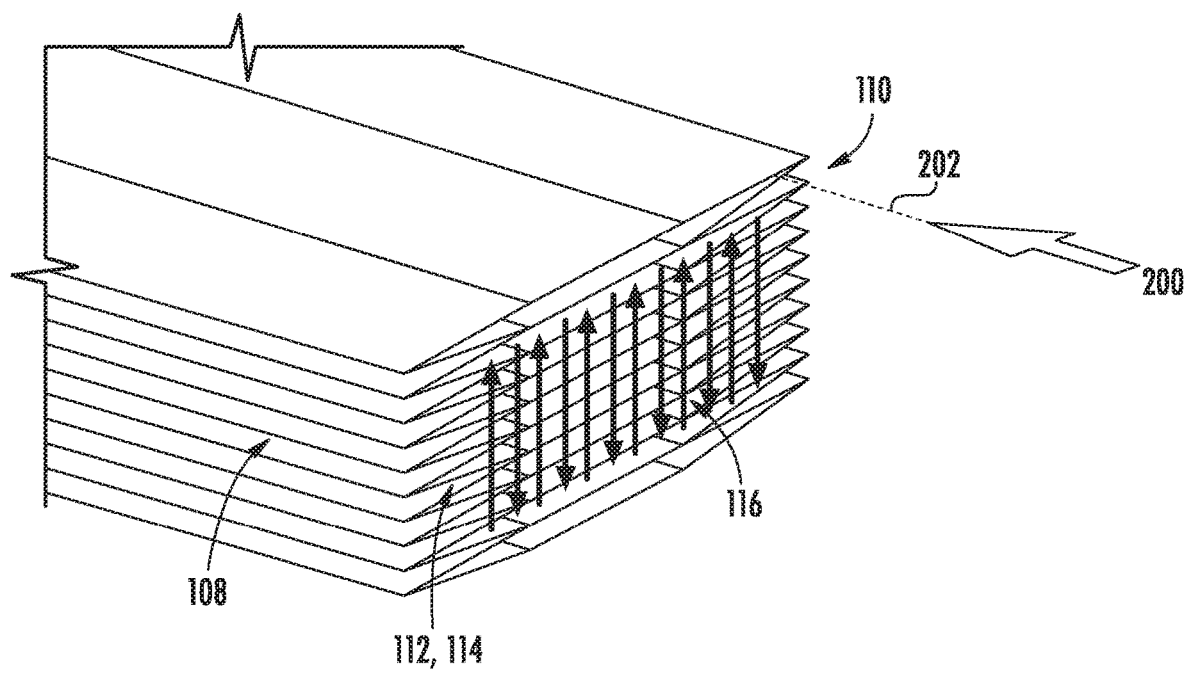
FIG. 5 is a perspective view illustrating the laser sealing the cut edge portions of the covering shown in FIGS. 3 and 4 in a fully compressed state.

Referring to FIGS. 3-5, an example of an embodiment of a system and method for laser sealing an edge portion of a covering of an architectural-structure-covering is illustrated. In use, the covering such as, for example, covering 106 may be initially cut to an appropriate size. The covering 106 may be cut to size by any suitable method now known or hereafter developed. For example, in one embodiment, the covering 106 is cut to an appropriate size using a knife, guillotine, or the like. After the covering 106 has been cut to an appropriate size, the cut covering 106 may be positioned on a suitable surface 120 such as, for example, a table. Thereafter, a laser 200 may be appropriately positioned to seal one or more cut edge portions of the covering such as, for example, lateral edges or portions 112, 114 to prevent fraying.

In accordance with one aspect of the present disclosure, the laser 200 may be positioned such that a beam 202 of the laser 200 (also referred to herein as laser beam) is directed parallel to the plane of the fabric (e.g., parallel to the plane of the cut fabric (perpendicular to the plane of the cut) and directed at the cut edge). In one embodiment, with the covering 106 in the form of a honeycomb covering (see FIGS. 4 and 5), the covering may be compressed so that the cut lateral edge portions 112, 114 of the covering 106 form opposite side surfaces 116. For example, the covering 106 may be stacked with adjacent layers of the covering 106 in a closed configuration (e.g., similar to the configuration of the covering in a retracted position). Thereafter, a laser 200 may be appropriately positioned so that, for example, the beam 202 of the laser 200 is directed at the side surface 116).

Subsequently, the laser 200 may be moved so that the beam 202 of the laser 200 scans, moves, etc. across the side surface 116 formed by the cut edge portion of the covering 106.

In one embodiment, the laser 200 may scan, move, etc. across, over, etc. all or at least some of the side surface 116 formed by the cut edge portions 112 (or 114) of the covering 106. That is, the laser beam 202 may oscillate across the side surface 116 of the covering 106 while simultaneously translating as it oscillates across all or at least some of the side surface 116 of the cut edge portions 112 (or 114) of the covering 106. For example, in one embodiment, as schematically illustrated in FIG. 5, the beam 202 from the laser 200 may translate over the side surface 116 of the covering 106 between the upper and bottom edge portions of the covering 106 so that the beam 202 impinges on the cut edge portions 112 (or 114) of the covering 106.

Figure 6:
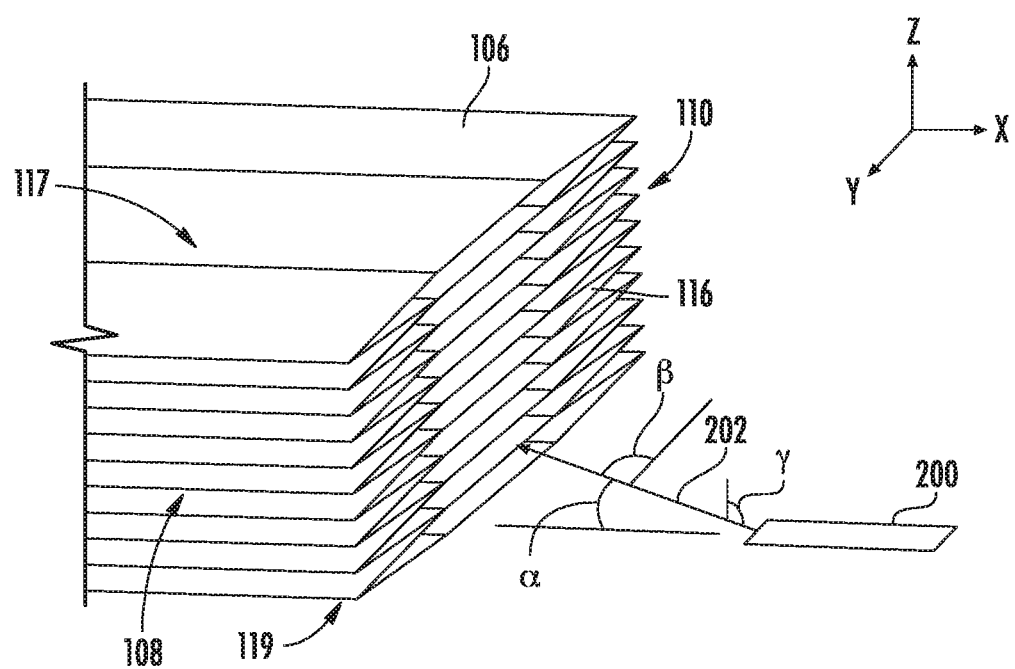
FIG. 6 is a perspective view illustrating a laser sealing cut edge portions of a covering in accordance with the present disclosure.

That is, for example, referring to FIG. 6, starting at a point adjacent to the upper portion or edge 117 of the covering 106, for example, adjacent to the corner of the upper, front surface 108 of the covering 106, the beam 202 of the laser 200 may translate along the Z-axis until the beam 202 of the laser 200 is positioned adjacent to the bottom portion or edge 119 of the covering 106. Thereafter, the beam 202 of the laser 200 may translate along the Y-axis by, for example, a predetermined distance and then translate along the Z-axis until the beam 202 of the laser 200 is positioned adjacent to the upper portion or edge 117 of the covering 106, and so on, until the entire, or substantially the entire, side surface 116 of the cut edge portion is scanned by the laser 200. Other translation and oscillation patterns are also envisioned, and will be understood by one of ordinary skill in the art. In addition, and/or alternatively, while the beam 202 of the laser 200 is show and described as scanning across a single side surface 116 of a covering 106, it is envisioned that multiple stacks of coverings 106 could be placed side by side and exposed to the laser in a continuous oscillating process.

In use, the beam 202 of the laser 200 is arranged and configured to apply heat to the cut edge portions of the fabric at discrete points or spots. Thus arranged, the laser 200 is arranged and configured to vaporize, cut, remove, etc. any loose fibers located along the cut edge portions 112, 114 of the covering 106. In addition, the laser 200 may be arranged and configured to melt portions of the fabric forming the covering 106 while preventing, or at least minimizing, melting of adjacent layers, for example, stacked, folded, or cellular coverings together. That is, the laser 200 is arranged and configured to supply sufficient heat at very discrete points of the fabric along the cut edge of the fabric layers to thereby prevent, or at least minimize, a fabric thread from pulling away and unravelling. In addition, it prevents, or at least greatly minimizes, sealing or melting together of adjacent layers or cells of a stacked, folded, or cellular covering. In use, the laser 200 is arranged and configured by adjusting and/or controlling the spacing between individual passes of the laser beam 202, the strength of the laser beam 202, the speed of travel of the laser beam 202, etc. By controlling the energy of the laser beam 202, the laser 200 is arranged and configured to supply enough energy to vaporize and/or melt any loose fragments of the fabric layers while preventing the layers from melting together. In one non-limiting example, the laser beam 202 may have a dimension or diameter of approximately 0.007-inch at its focal point. In one non-limiting example, the laser 200 may scan across the surface of the fabric of the covering 106 to obtain approximately 40 lines or scans per inch.

In various embodiments, the laser beam 202 also cuts the outer fibers of the covering 106 into small pieces. For example, according to the distance between scans, which in one example of an embodiment can be approximately 40 scans per inch, a cut yarn length of approximately 0.025" will remain. Alternatively, in another example of an embodiment, utilizing 20 scans per inch leaves a cut yarn length of approximately 0.050". Utilization of the laser beam 202 to seal the side surfaces of the covering 106, not only is the yarns cut into small pieces, which prevents, or at least minimizes, a full, continuous length of yarn that can be pulled off of the edge of the fabric, but it also provides heating energy at selected points, to melt the remaining fibers together, as previously described.

While the beam 202 of the laser 200 has been described and illustrated as being positioned perpendicular to the surface of the cut edge, one of ordinary skill in the art will appreciate that some deviation is possible. For example, referring to FIG. 6, it is envisioned that the beam 202 of the laser 200 may be angled relative to the side surface 116 of the covering 106 in up to three different axes, represented by α, β, and γ.

In one non-limiting embodiment, the beam 202 of the laser 200 may have a beam spot size of approximately 0.007 inches, a laser power of approximately 45 watts, a traversing speed of approximately 60 inches per second, and a line spacing of approximately 0.025 inches, though it will be appreciated that other dimensions, etc. are contemplated. In one embodiment, a first pass of the laser beam 202 is made over the surface of the cut edge of the covering with a line spacing of approximately 0.050 inches. Thereafter, a second pass of the laser beam 202 is made over the surface of the cut edge of the covering with a line spacing of 0.050 inches but offset from the first pass by 0.025 inches. By providing two scans with increased line spacing, offset from one another, heat buildup is minimized.

In one non-limiting embodiment, when used in connection with, for example, a medium weight drapery fabric, the beam 202 of the laser 200 may have a beam spot size of approximately 0.007 inches, a laser power of approximately 20 watts, a traversing speed of approximately 20 inches per second, and a line spacing of approximately 0.050 inches, though it will be appreciated that other dimensions, etc. are contemplated. In one embodiment, a first pass of the laser beam 202 is made over the surface of the cut edge of the covering with a line spacing of approximately 0.100 inches. Thereafter, a second pass of the laser beam 202 is made over the surface of the cut edge of the covering with a line spacing of 0.100 inches but offset from the first pass by 0.050 inches.

While the present disclosure refers to certain embodiments, numerous modifications, alterations, and changes to the described embodiments are possible without departing from the sphere and scope of the present disclosure, as defined in the appended claim(s). Accordingly, it is intended that the present disclosure not be limited to the described embodiments, but that it has the full scope defined by the language of the following claims, and equivalents thereof.

The foregoing description has broad application. It should be appreciated that the concepts disclosed herein may apply to many types of coverings, in addition to the coverings described and depicted herein. Moreover, it should be appreciated that the concepts disclosed herein may apply to other areas outside of architectural-structure coverings. For example, the concepts apply equally to any number of layers of woven fabric that has been cut or slit with a knife or blade.

The discussion of any embodiment is meant only to be explanatory and is not intended to suggest that the scope of the disclosure, including the claims, is limited to these embodiments. In other words, while illustrative embodiments of the disclosure have been described in detail herein, it is to be understood that the inventive concepts may be otherwise variously embodied and employed, and that the appended claims are intended to be construed to include such variations, except as limited by the prior art.

As used herein, an element or step recited in the singular and proceeded with the word "a" or "an" should be understood as not excluding plural elements or steps, unless such exclusion is explicitly recited.

The phrases "at least one", "one or more", and "and/or", as used herein, are open-ended expressions that are both conjunctive and disjunctive in operation. The terms "a" (or "an"), "one or more" and "at least one" can be used interchangeably herein. Connection references (e.g., engaged, attached, coupled, connected, and joined) are to be construed broadly and may include intermediate members between a collection of elements and relative to movement between elements unless otherwise indicated. As such, connection references do not necessarily infer that two elements are directly connected and in fixed relation to each other. The drawings are for purposes of illustration only and the dimensions, positions, order and relative to sizes reflected in the drawings attached hereto may vary.

The foregoing discussion has been presented for purposes of illustration and description and is not intended to limit the disclosure to the form or forms disclosed herein. For example, various features of the disclosure are grouped together in one or more aspects, embodiments, or configurations for the purpose of streamlining the disclosure. However, it should be understood that various features of the certain aspects, embodiments, or configurations of the disclosure may be combined in alternate aspects, embodiments, or configurations. Moreover, the following claims are hereby incorporated into this Detailed Description by this reference, with each claim standing on its own as a separate embodiment of the present disclosure.

What is claimed is:

1. A method for laser sealing a cut edge portion of a covering of an architectural-structure-covering, the method comprising:
    positioning said covering on a surface;
    positioning a laser relative to said covering so that a beam of said laser contacts said cut edge portion of said covering, said laser oriented so that the beam is non-perpendicular to a plane of the covering; and
    moving said beam of said laser across said cut edge portion of the covering to seal said cut edge portion to prevent fraying.

2. The method of claim 1, wherein the covering is a honeycomb covering.

3. The method of claim 2, further comprising compressing the honeycomb covering into a closed position.

4. The method of claim 1, wherein moving said beam of said laser across said cut edge portion comprises oscillating said beam of said laser across a surface of said cut edge portion of the covering.

5. The method of claim 4, wherein said beam of said laser oscillates across said surface of said cut edge portion of the covering with 40 lines per inch.

6. The method of claim 1, wherein said beam of said laser is arranged and configured to apply heat to said cut edge portion of the covering at discrete points or spots.

7. The method of claim 6, wherein said beam of said laser has a diameter at its focal point of approximately 0.007-inch.

8. The method of claim 1, wherein said beam of said laser is arranged and configured to vaporize loose fibers located along said cut edge portion of the covering.

9. The method of claim 1, wherein said beam of said laser is arranged and configured to cut loose fibers located along said cut edge portion of the covering.

10. The method of claim 1, positioning a laser relative to said covering includes positioning said laser so that the beam is parallel to a plane of said covering.

11. The method of claim 1, positioning a laser relative to said covering includes positioning said laser so that the beam is perpendicular to a plane of said cut edge portion of the covering.

* * * * *